United States Patent Office 3,470,905
Patented Oct. 7, 1969

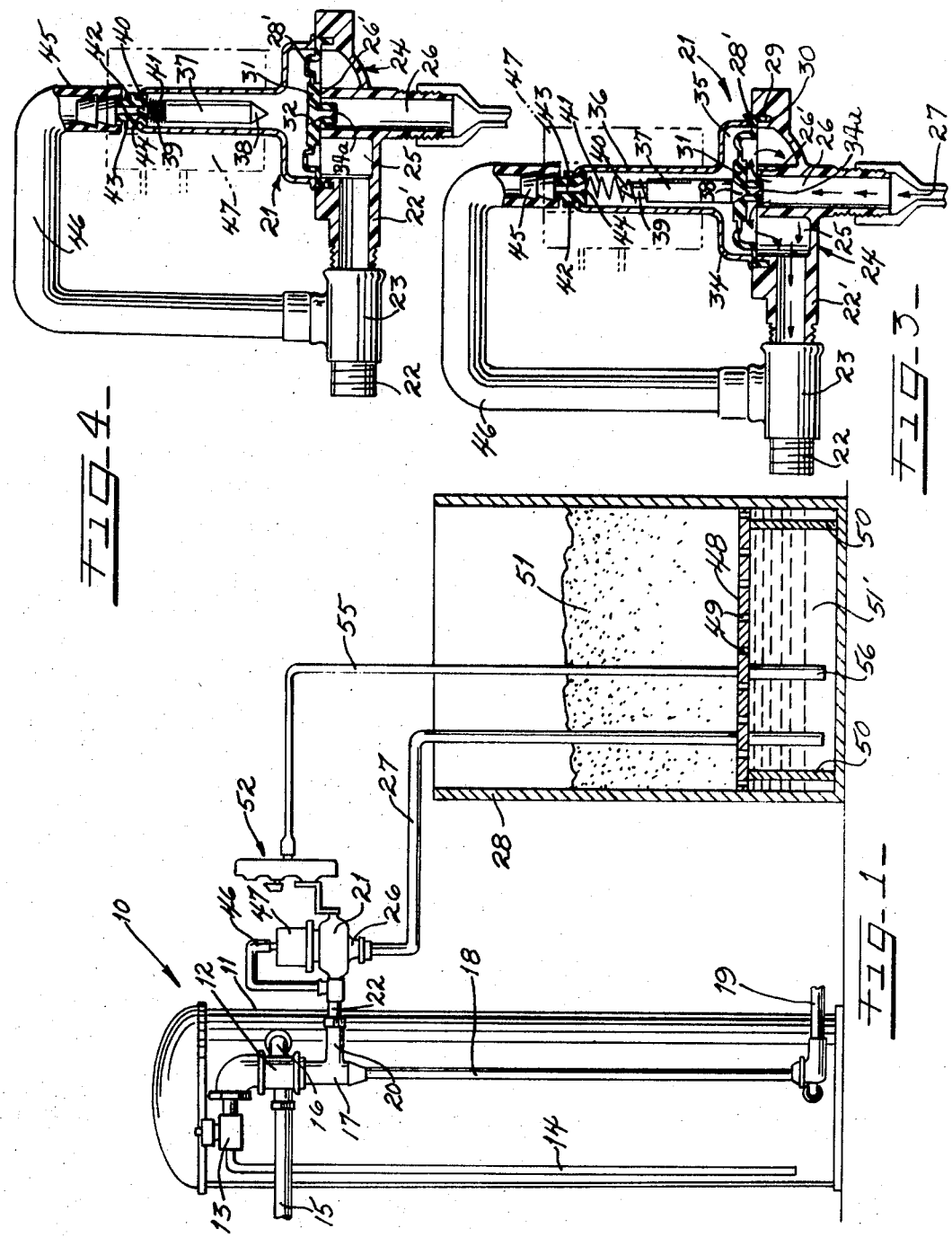

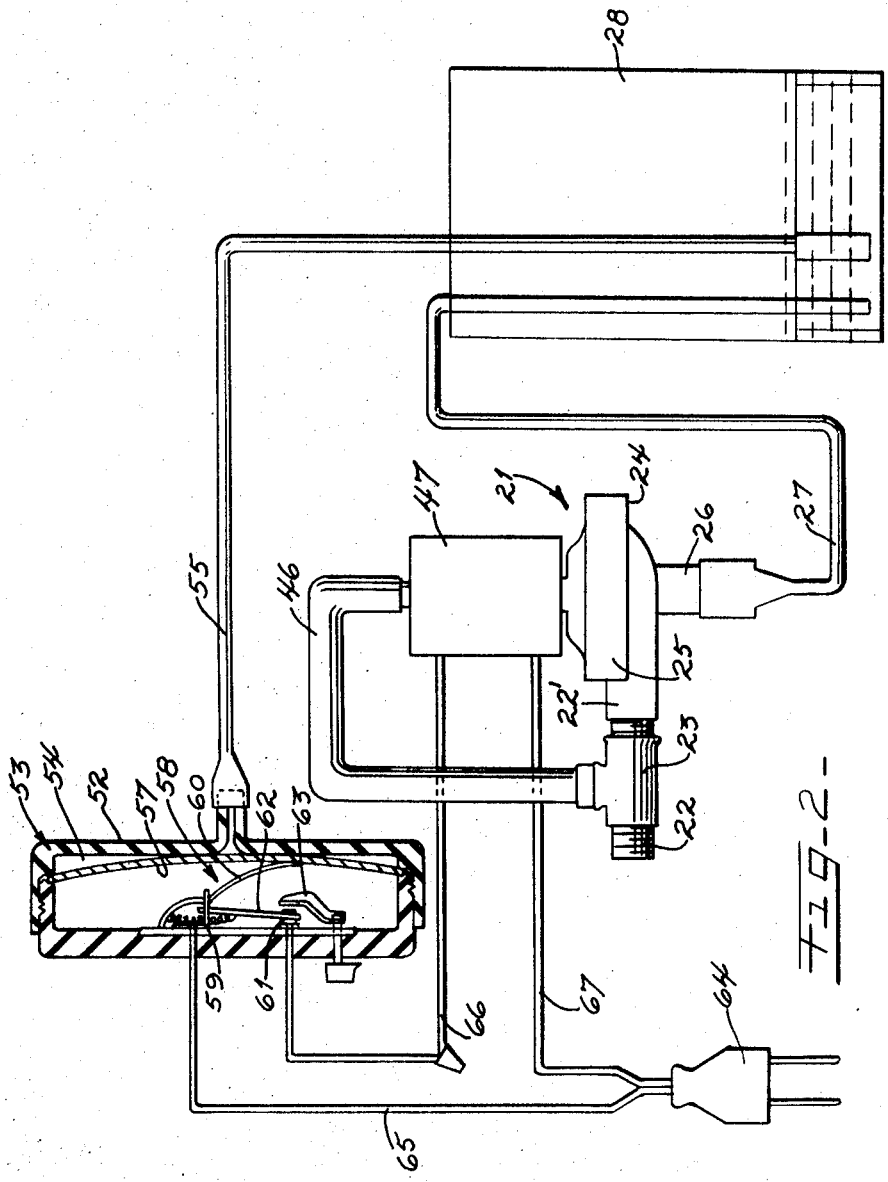

3,470,905
PRESSURE RESPONSIVE DEVICE FOR CONTROLLING LIQUID LEVEL IN TANKS
Don Edward Heskett, P.O. Box 262,
Villa Park, Ill. 60181
Filed Apr. 9, 1965, Ser. No. 446,995
Int. Cl. F17d 3/00; E03b 11/00; F16k 31/12
U.S. Cl. 137—571                22 Claims

ABSTRACT OF THE DISCLOSURE

An arrangement for transfer of brine from a brine tank to a water softening conditioner by way of a valve unit having an orificed diaphragm and a solenoid plunger and operated in a vacuum line connecting the tanks by a vacuum unit on the water conditioner, the vacuum unit acting on the flexible orificed seat diaphragm, which defines a relief chamber that has an orificed seat conduit that communicates with the vacuum line to create a differential pressure on the diaphragm with the movement of an electrical acting pressure responsive switch, said switch energizing and de-energizing the solenoid plunger reciprocally to alternate conduit and diaphragm orifice seat positions in the chamber, the plunger having opposed seat ends for alternate seating in the diaphragm orificed seat and the conduit orificed seat.

---

This invention relates to an improvement in water conditioning systems and more particularly to an improved device for controlling the liquid level in a brine tank.

This application is an improvement over applicant's co-pending application Serial No. 409,092 filed November 5, 1964. It is a prime object of this invention to provide an improved and greatly simplified water softening system wherein an electrical solenoid valve is disposed between the water tank and a brine tank and is adapted to draw brine from the brine tank to the softener tank during the application of a suction on the solenoid valve.

A still further object is the provision of a simplified solenoid valve responsive to draw fluid from one tank to another upon the application of suction, the valve including novel means for regulating the flow therethrough and for closing and opening in response to electrical control in turn operated by means of a pressure sensitive switch.

These and other objects will become more readily apparent from a reading of the description when read in connection with the accompanying sheets of drawings.

FIG. 1 is a side elevational view of an improved water conditioning system showing a sectional view of a brine tank and control means provided therefore;

FIG. 2 is a schematic view of a water conditioning system shown in FIG. 1, and showing a cross section through an improved electrical pressure responsive switch combined in the system;

FIG. 3 is a side elevational view, particularly in cross section, of an improved electrical solenoid type control valve adapted to control the flow of liquid from the brine tank to the water tank of the water softening system, the said valve being shown in an open operation;

FIG. 4 is a view similar to FIG. 3 of a solenoid type valve showing the valve in a closed position.

Referring now particularly to FIGS. 1 and 2, a water softening system is generally designated by the reference character 10. The system 10 comprises a water conditioning tank or chamber 11 having connected thereto an electrical control valve 12 more specifically disclosed in applicant's Patent 3,130,154 patented April 21, 1964. The electrical control valve 12 is connected to a solenoid valve 13 in turn connected to a drain line 14 for suitably draining water from the tank 11 as desired. A water inlet line 15 is connected to the electrical valve 12 which in turn by means of an inlet connection 16 is connected to the tank 11. The electrical valve 12 is provided with a venturi type injector 17 or vacuum producing means of conventional construction and which is disclosed in the aforementioned patent. The injector 17 communicates with a conduit 18 in turn connected to the tank 11 and also to an outlet 19 extending to the water system which is supplied by the water softening arrangement.

A brine connection 20, as best shown in FIG. 1, is in communication with the injector 17. The brine connection 20 extends from the injector 17 to a solenoid valve 21 best shown in FIGS. 1 through 3. A first conduit 22 communicates with the brine connection 20 and communicates with a conduit T-fitting 23 which also has connected thereto a suitable conduit extension 22'.

The solenoid valve 21 comprises a housing 24 which includes therein a first conduit connection 25 which is in communication with the conduit extension 22', T-fitting 23 and first conduit 22. A second conduit connection extends from the housing 24 and is in communication with a second conduit 27 in turn communicating with the lower portion of a brine chamber or tank 28. The second conduit 26 is provided at its top end with a valve seat 26'. A diaphragm valve 28' is provided at its lower end with an annular end portion 29 which is suitably clamped within an annular recess 30 formed in the housing 24. The diaphragm valve 28' comprises a centrally disposed cylindrical valve element 31 having formed therein a conical opening 32 as best shown in FIG. 4.

The valve element 31 is also provided with a projection providing a passage 34a extending down into the second conduit connection 26. A generally cylindrical cap member 34 is suitably connected to the housing 24 to provide with said housing a third chamber 35 above the diaphragm 28'. The cap member 34 includes an upstanding cylindrical portion 36 having positioned for reciprocation therein an electrically actuated element or plunger 37. The plunger 37 is provided at its lower end with a conical end portion 38 adapted to engage and close the opening 32 as best shown in FIG. 3. The electrically actuated plunger 37 is provided at its upper end with a reduced portion 39 and at its extremity with a conical upper end portion 40. A spring 41 supported on the reduced portion 39 normally urges the plunger 37 into its closing or lowered engagement with the opening 32 as best shown in FIG. 3.

As shown in FIGS. 3 and 4 a connector element 42 is provided at the upper extremity of the cylindrical portion 36. The connector element 42 comprises a bore 43 which communicates with a conical valve seat 44 adapted to be closed by means of the conical upper end portion 40 of the plunger 37 as best shown in FIG. 4. The connector element 42 also includes a hose connecting portion 45 to which a flexible hose 46 is connected, the said flexible hose being in communication with the T-fitting 23 and the first conduit 22.

A solenoid coil of conventional construction is shown in FIGS. 1 through 4 and need not be further described. The brine tank 28 comprises a grid table 48 having a plurality of openings 49 and being supported on supports 50. The grid table is adapted to support a load of salt 51 which by the engagement of fluid within the chamber 28 provides brine at the lower end of said chamber as designated at 51'.

As best shown in FIG. 2 a diaphragm switch is designated at 52 and this switch is particularly described in the aforementioned co-pending application. The diaphragm switch is of the pressure responsive type and includes a casing 53 having a diaphragm chamber 54. The diaphragm chamber 54 is in communication with a conduit 55 extending to the lower portion of the tank 28 as indicated at 56. The switch further comprises a switch arrangement 57 in which a switch 58 is generally designated. The switch 58 comprises a contact and support 59 which pivotally supports a switch arm 60 in engagement with the diaphragm 57. A contact 61 is adapted to be engaged by a switch arm 62 normally regulated by means of an adjustable stop 63.

A plug-in connector 64 has a wire 65 connected to the contact 59 and has a wire 67 connected to the solenoid 47. The solenoid 47 by means of a wire 66 is also connected to the contact 61 as indicated.

The operation

The operation of the water softening system 10 is conventional and is well described in the aforementioned co-pending application and the patent. During the brine cycle the injector 17 provides a source of vacuum which in turn provides a suction on the conduit 22. As mentioned in the aforementioned U.S. Patent No. 3,130,154, the operation of the brine delivery to the water softening tank 11 is accomplished by the timer actuated solenoid valve 13 on the water conditioning tank 11 which allows water to pass through valve 12 and the pipe 14 to drain on the water softening tank 11 that connects with pipe 22 to create a vacuum in pipe 22 to such brine from brine tank 28 to the water softening tank 11. At this point the valve 21 is non-electrically energized and the plunger 37 is in the lowered position shown in FIG. 3. As the suction is applied by the injector 17, the valve element 31 is lifted from its valve seat 26' permitting the flow of brine, due to the suction, from the brine tank 28 through the conduit 27, connection 26, conduit connection 25, through the first conduit 22 and to the tank 11. This action of the valve element 31 results from the following action: A certain amount of fluid within the third chamber 35 provides a sufficient pressure differential to normally close and maintain the valve element 31 in the position shown in FIG. 4. With the plunger 37 in the position showyn in FIG. 3 and the suction being applied on the conduit 22, pressure is reduced in chamber 35 relative to pressure in chamber 26 creating a pressure differential across diaphragm 31 which moves off its seat and displaces some liquid in chamber 35. Thus now the pressure differential between the chamber 35 and the second conduit connection 26 causes the valve element 31 to move to the position shown in FIG. 3 and thus effect the desired brine flow.

As the brine from the tank 28 continues to flow to the tank 11 the brine level of course decreases and air pressure within the chamber 54 is relieved since the lowering of the fluid level within the conduit 49 causes the diaphragm to assume the position shown in FIG. 2 whereupon the contact 62 now closes and the solenoid 47 is energized. The operation of the switch is fully further described in the aforementioned patent application. In other words the lowering of the brine level within the tank 28, to the desired level, causes movement of the diaphragm 57 to a position wherein the arm 62 is moved to the closed position of FIG. 2. This closes the electrical circuit and energipes the solenoid whereupon the plunger 37 is moved upwardly to the position shown in FIG. 4 wherein the conical portion 40 closes the opening 43 and prevents any further flow of brine from the chamber 35 through the conduit 46. The opening 34 now permits brine to flow into the chamber 35 and the pressure differential upon the valve element 31 causes the same to assume the closed position shown in FIG. 4 whereupon the brine flow ceases. To fill up the brine tank 28 with water it is a simple matter for the solenoid valve 13 de-energized by the timer to allow control valve 12 to direct water through the connections 20, 22 which force up the diaphragm valve 31 and provide for the flow of water into the tank 28 through the conduit 27 as described in the aforementioned patent and patent application. That is, the water from the tank 11 enters conduits 22 but not chamber 35 which is closed by the plunger 37 and under low pressure with chamber 26 and water from tank 11 enters chamber 25 under higher pressure and this pressure differential between chambers 25 and 26 raises diaphragm valve 31 off its seat. The water entering tank 28 builds up the pressure in diaphragm chamber 54 which operates and moves switch 58 to the off position and de-energizes valve plunger 37 which falls in opening 32 (as shown in FIGURE 3) and water now going into conduit 46 and to chamber 35 creates a pressure differential across diaphragm 31 which moves diaphragm 31 to its seat 26' and terminates water flow to brine tank 28.

The conduit 46 and plunger arrangement 37 provides for the positive and simple elimination of the fluid within the valve chamber 35 so as to provide for the opening function of the diaphragm valve element 31. By this manner the continued operation is guaranteed without any possibility of malfunction of the valve means necessary to provide for the initial opening of the solenoid valve. In this manner such proper function is at all times assured and this is of course exceedingly important in the water softening industry so that under no circumstances does the brine flow overflow the tank. By this arrangement any possibility of malfunctioning is eliminated and positive control of the brine cycle is assured.

Thus it is believed that the objects of the invention have been fully achieved and that an improved control is provided for a fluid transfer or water conditioning system.

What is claimed is:

1. In a fluid transfer system including first and second chambers, a first conduit connected to said first chamber, a second conduit connected to said second chamber, each of said conduits being connected to each other in series arrangement, a source of vacuum being connected to the first conduit and adapted to provide a suction on said conduits for drawing fluid from said second chamber through said second and first conduits for delivery to said first chamber; an electrically controlled valve arrangement connected in series arrangement between the conduits including a housing having a first conduit connection communicating with said first conduit and a second conduit connection communicating with said second conduit, a valve seat interposed between the conduit connections and being within said housing, said valve seat having a flow passage adapted to provide communication between said conduit connections, a pressure responsive diaphragm valve within said housing being movable by fluid pressure toward and away from said seat and adapted to engage said valve seat to open and close said valve seat flow passage to regulate the flow of fluid through said valve seat flow passage, said diaphragm valve and said housing defining a valve chamber, said diaphragm valve including a port between the valve seat flow passage and the valve chamber and adapted to communicate with said valve seat flow passage and the valve chamber, an electrically actuated valve means in said valve chamber being selectively engageable with the diaphragm port for alternate closure thereof, a third conduit connection on said housing having a passage connecting and communicating with said first connection and said valve chamber for allowing a differential pressure to occur across said diaphragm valve, said third conduit connection during a suction on said first connection providing for a reduction of pressure in said valve chamber to said first connection whereby a differential of pressure across said diaphragm valve unseats said diaphragm valve and for fluid flow from said second chamber to said first chamber, and electrical means operatively connected with the actuating valve means for actuating said actuating valve means to move from said diaphragm port for fluid flow from said second connection to said valve chamber through said valve seat opening and said diaphragm port and the pressure differential thereby developed across said diaphragm valve seats the diaphragm valve to close.

2. In a fluid transfer system in accordance with claim 1, wherein said third conduit connection passage is disposed in axially aligned relation to said diaphragm port.

3. In a fluid transfer system in accordance with claim 1, said electrically actuated valve means including a check valve means adapted to close said third conduit connection passage during the closed position of said diaphragm valve.

4. In a fluid transfer system in accordance with claim 1, said electrically actuated valve means comprising a plunger having a first portion for closing of said diaphragm port and an axially spaced portion adapted to engage and close said third conduit connection passage during the closed position of said diaphragm valve.

5. In a fluid transfer system in accordance with claim 1, said housing including an annular hollow portion defining the valve chamber and extending substantially coaxially with said diaphragm port and having at its upper end said third conduit connection passage communicating with said third connection during the open position of said diaphragm valve, said electrically actuated valve means comprising a plunger having a first lower portion for closing said diaphragm port during the open position of said diaphragm valve and an upper axially spaced portion adapted to engage and close said third conduit connection passage during the closed position of said diaphragm valve.

6. A suction operated valve arrangement for transfer of fluid between a pair of vessels comprising a suction applied side first passage, a second passage connected in series with said first passage for transfer of fluid by suction from the second passage to said first passage, a valve seat being interposed between each passage and including a valve seat opening to provide for fluid suction communication from the first passage to the second passage, a pressure responsive valve being interposed between said valve seat and said first passage in fluid obstructing relation between the passage and being engageable with said seat to terminate fluid flow through said opening between the passages and being moved toward and away from said valve seat in response to fluid pressure, a casing disposed over said valve to define an entombed control chamber with the valve, said chamber having a suction applied pressure flow means communicating with the first passage, said valve having a port therethrough communicating with said second passage in seated position and communicating with both passages in its unseated position, movable valve means being in said chamber between said flow means and said port and being movable into selective alternate engagement positions with said flow means or port for alternately closing the flow means of said port, said flow means under suction when said valve means is seated on said port providing for a reduction in pressure in said chamber to produce a differential pressure across said valve which unseats said valve from said opening allowing fluid flow from the second passage through the valve seat opening to the first passage, and valve operating means operatively connected with said movable valve means for moving said valve means from seating engagement on said port to seating engagement with said flow means allowing for fluid communication from said second passage means through said opening and said port to said chamber to produce a differential pressure across the valve to seat said valve to terminate fluid communication between the passages.

7. The invention according to claim 6 and said valve being provided with a projection having said port therein and extending into said opening in the seated position of the valve.

8. The invention according to claim 6 and said movable valve means comprising a solenoid operated plunger energizable to move from one position to the other position.

9. The invention according to claim 8 and biasing means to return the plunger when de-energized to the other position.

10. The invention according to claim 6 and said movable valve means including a plunger having a first end valve part to engage the flow means and a second opposed end part to engage the port.

11. The invention according to claim 10 and each valve part being generally axially aligned with one another and the flow means and the port.

12. The invention according to claim 6 and said casing of said control chamber having an orifice means defining said flow means.

13. The invention according to claim 6 and said pressure responsive valve being in the form of a flexible diaphragm and said flow means being a bleed orifice in said casing.

14. The invention according to claim 6 and said movable valve means being electrically operated.

15. A fluid transfer system for filling and withdrawing fluid between two fluid chambers including:
 (a) a first fluid chamber and a second fluid chamber;
 (b) a fluid flow line communicating with said chambers;
 (c) means for introducing a source of fluid to said flow line;
 (d) means for connecting a source of vacuum to said flow line for withdrawing fluid from said second chamber to said first chamber;
 (e) a valve means arranged in said flow line having:
  (1) a valve seat interposed in said valve means defining a flow path; and
  (2) a pressure responsive valve member arranged in operative opening and closing relation to said valve seat alternately allowing and preventing fluid flow between the chambers;
 (f) means for introducing vacuum to said valve means to actuate said valve member and open said flow path to permit withdrawal of fluid from said second chamber, said means for introducing vacuum being connected with said valve member to define a control chamber preventing communication between said first and said second chambers when said valve member is in closing relation to said seat; and
 (g) said valve member having flow means for introducing a portion of the fluid being withdrawn from said second chamber to said control chamber to actuate said valve member and close said flow path.

16. The structure set forth in claim 15 and valve means having means therein for closing said vacuum introducing means simultaneously with the introduction therein of withdrawal fluid.

17. The structure set forth in claim 15 and said pressure responsive valve member comprising a flexible diaphragm dividing said valve means into a flow chamber on one side thereof having said valve seat therein and said control chamber on the other side thereof.

18. The structure set forth in claim 17 wherein said flow means includes a passage through said diaphragm generally overlying said valve seat permitting flow through said diaphragm from said second chamber into said control chamber until said control chamber is filled.

19. The structure set forth in claim 17 and said valve means including a valve part arranged in said control chamber in relation to close communication between said control chamber and said first chamber and open said flow means in one position and open communication between said control chamber and said first chamber and close said flow means in a second position.

20. The structure as set forth in claim 19 and said valve part being magnetic and a solenoid positioned about said valve means to control said valve part.

21. The structure set forth in claim 20 and switch means responsive to the level in said second chamber to energize said solenoid when the fluid reaches a lower level and de-energize said solenoid when the fluid reaches an upper level.

22. The structure set forth in claim 15 wherein said vacuum introducing means includes a vacuum supply conduit extending from said fluid flow line to said control chamber.

References Cited

UNITED STATES PATENTS

| | | | |
|---|---|---|---|
| 3,130,154 | 4/1964 | Heskett | 137—403 |
| 2,940,722 | 6/1960 | Vargo | 251—30 |

M. CARY NELSON, Primary Examiner

WILLIAM R. CLINE, Assistant Examiner

U.S. Cl. X.R.

251—30